United States Patent
Edwards et al.

(10) Patent No.: US 10,473,345 B2
(45) Date of Patent: Nov. 12, 2019

(54) COOLED FAN FOR MICRO-CLIMATE CONTROL

(71) Applicant: Phononic, Inc., Durham, NC (US)

(72) Inventors: Jesse W. Edwards, Wake Forest, NC (US); Devon Newman, Morrisville, NC (US); Erik P. Miller, Fuquay Varina, NC (US)

(73) Assignee: Phononic, Inc., Durham, NC (US)

( * ) Notice: Subject to any disclaimer, the term of this patent is extended or adjusted under 35 U.S.C. 154(b) by 242 days.

(21) Appl. No.: 15/628,066

(22) Filed: Jun. 20, 2017

(65) Prior Publication Data

US 2017/0363307 A1    Dec. 21, 2017

Related U.S. Application Data

(60) Provisional application No. 62/352,283, filed on Jun. 20, 2016.

(51) Int. Cl.
*F25B 21/02* (2006.01)
*F24F 5/00* (2006.01)
(Continued)

(52) U.S. Cl.
CPC .......... *F24F 5/0042* (2013.01); *F24F 1/0022* (2013.01); *F24F 1/0059* (2013.01);
(Continued)

(58) Field of Classification Search
CPC ...... B01D 45/14; F24F 5/0042; F24F 1/0022; F24F 1/0059; F24F 12/003; F24F 2203/104; F25B 21/02; Y02B 30/52; Y02B 30/563
(Continued)

(56) References Cited

U.S. PATENT DOCUMENTS 5,865,031 A    2/1999  Itakura
6,120,247 A    9/2000  Wheeler
(Continued)

FOREIGN PATENT DOCUMENTS

EP    2503611 A2    9/2012
JP    H09-321348 A    12/1997
(Continued)

OTHER PUBLICATIONS

Notice of Reasons for Refusal for Japanese Patent Application No. 2016-550688, dated Jul. 3, 2018, 11 pages.
(Continued)

*Primary Examiner* — Davis D Hwu
(74) *Attorney, Agent, or Firm* — Withrow & Terranova, PLLC

(57) ABSTRACT

A micro-climate control system includes a thermoelectric system integrated with a fan assembly. The thermoelectric system is operable to actively cool or heat air as the air passes through the fan assembly. The thermoelectric system includes a thermoelectric heat pump, a heat reject subsystem, and a heat accept subsystem. The fan assembly is operable to draw air from a space to be conditioned and output conditioned air passed through one of the heat reject subsystem and the heat accept subsystem to the space to be conditioned and output air passed through the other away from the space to be conditioned. In this way, the micro-climate control system may provide localized comfort, while allowing a larger climate control system to maintain a more efficient temperature set point. In this way, the overall energy consumption may be reduced while providing the same level of effective comfort.

16 Claims, 4 Drawing Sheets

(51) Int. Cl.
*F24F 1/0022* (2019.01)
*F24F 1/0059* (2019.01)
*F24F 12/00* (2006.01)

(52) U.S. Cl.
CPC ...... *F24F 12/003* (2013.01); *F24F 2203/104* (2013.01); *F25B 21/02* (2013.01); *Y02B 30/52* (2013.01); *Y02B 30/563* (2013.01)

(58) Field of Classification Search
USPC .......................................................... 62/3.2
See application file for complete search history.

(56) References Cited

U.S. PATENT DOCUMENTS

| | | |
|---|---|---|
| 6,345,507 B1 | 2/2002 | Gillen |
| 8,893,513 B2 | 11/2014 | June et al. |
| 9,144,180 B2 | 9/2015 | Olsson et al. |
| 2002/0038550 A1 | 4/2002 | Gillen |
| 2003/0024565 A1 | 2/2003 | Guy |
| 2004/0068991 A1 | 4/2004 | Banney et al. |
| 2005/0126184 A1 | 6/2005 | Cauchy |
| 2006/0101830 A1 | 5/2006 | Cohen et al. |
| 2006/0232891 A1 | 10/2006 | Bushnik et al. |
| 2008/0047241 A1* | 2/2008 | Lillquist ................ B01D 45/14 55/467 |
| 2012/0201008 A1 | 8/2012 | Hershberger et al. |
| 2013/0061900 A1 | 3/2013 | Tachibana |
| 2013/0227966 A1 | 9/2013 | Ayres et al. |
| 2014/0117528 A1 | 5/2014 | Byun et al. |
| 2014/0150839 A1 | 6/2014 | Hershberger et al. |
| 2015/0354869 A1 | 12/2015 | Edwards et al. |

FOREIGN PATENT DOCUMENTS

| | | |
|---|---|---|
| JP | H10-125962 A | 5/1998 |
| JP | 2000124510 A | 4/2000 |
| JP | 2008519600 A | 6/2008 |
| JP | 2012156227 A | 8/2012 |
| JP | 2013077810 A | 4/2013 |
| WO | 2004054007 A2 | 6/2004 |
| WO | 2009015235 A1 | 1/2009 |
| WO | 2011127416 A2 | 10/2011 |

OTHER PUBLICATIONS

International Preliminary Report on Patentability for International Patent Application No. PCT/US2017/038314, dated Jan. 3, 2019, 9 pages.
Decision to Grant a Patent for Japanese Patent Application No. 2016-550688, dated Feb. 26, 2019, 6 pages.
Notice of Allowance for U.S. Appl. No. 14/525,843, dated Feb. 9, 2015, 8 pages.
International Search Report and Written Opinion for International Patent Application No. PCT/US2014/062685, dated Jan. 16, 2015, 11 pages.
International Preliminary Report on Patentability for International Patent Application No. PCT/US2014/062685, dated Jan. 1, 2016, 7 pages.
First Office Action for Chinese Patent Application No. 201480059279.9, dated Jan. 25, 2018, 23 pages.
International Search Report and Written Opinion for International Patent Application No. PCT/US2017/038314, dated Sep. 22, 2017, 15 pages.
Notice of Reasons for Refusal for Japanese Patent Application No. 2016-550688, dated Nov. 21, 2017, 14 pages.

* cited by examiner

COOLED FAN FOR MICRO-CLIMATE CONTROL

RELATED APPLICATIONS

This application claims the benefit of provisional patent application Ser. No. 62/352,283, filed Jun. 20, 2016, the disclosure of which is hereby incorporated herein by reference in its entirety.

FIELD OF THE DISCLOSURE

The present disclosure generally relates to fans and more particularly relates to micro-climate control.

BACKGROUND

Traditional systems used to pump heat to and from a room to reduce or increase air temperature have several shortcomings. In particular, they become inefficient at smaller capacities, they generate an uncomfortable level of noise in occupied spaces from the mechanical components, they can be cumbersome and even dangerous to install, they often require dedicated electrical power outlets to manage surge loads, and they often use toxic and environmentally harmful refrigerants to provide heat pumping.

A common alternative to these traditional systems is to simply use a basic fan (e.g., a ceiling fan or a standing fan). A typical fan can provide an apparent and virtually silent improvement in comfort level derived from either the enhancement of the body's natural cooling system or increase in the delivery rate of warmed air to a user of the fan. This effect is provided simply by the localized increase in the mass flow of air, not by any reduction or increase in air temperature. In humid climates this effect is greatly reduced and the apparent relief is largely eliminated because the air cannot easily absorb any additional water vapor. In hot, humid environments, when trying to provide a cooling effect, a fan, at best, simply stirs the hot, moist air around, ensuring uniform discomfort. At worst, the mechanical and electrical work done by a fan will actually warm the air being moved, thereby reversing the desired effectiveness of the appliance in providing cooling relief to the user. In cold, dry environments, additional air flow from a fan without a true increase in air temperature can actually cause the user to feel colder and less comfortable by the same mechanism that provides the cooling effect in warmer conditions.

As such, there remains a need for cooling or heating an occupied space.

SUMMARY

A cooled fan for micro-climate control is provided herein. In some embodiments, a micro-climate control system includes a fan assembly and a thermoelectric system integrated with the fan assembly. The thermoelectric system is operable to actively cool or heat air as the air passes through the fan assembly. The thermoelectric system includes a thermoelectric heat pump, a heat reject subsystem, and a heat accept subsystem. The fan assembly is operable to draw air from a space to be conditioned. The fan assembly is also operable to output conditioned air passed through one of the heat reject subsystem and the heat accept subsystem to the space to be conditioned and output air passed through the other one of the heat reject subsystem and the heat accept subsystem away from the space to be conditioned. In this way, conditioned air can be provided to a localized area with a system that maintains a small envelope. A micro-climate control system may provide localized comfort while allowing a larger climate control system to maintain a more efficient temperature set point. In this way, the overall energy consumption may be reduced while providing the same level of effective comfort.

In some embodiments, at least one of the heat reject subsystem and the heat accept subsystem includes a radial heat exchanger. In some embodiments, the heat reject subsystem comprises a radial heat exchanger and the heat accept subsystem comprises a radial heat exchanger.

In some embodiments, the thermoelectric system is operable to cool the space to be conditioned, the fan assembly is operable to output conditioned air passed through the heat accept subsystem to the space to be conditioned, and the fan assembly is operable to output air passed through the heat reject subsystem away from the space to be conditioned.

In some embodiments, the thermoelectric system is operable to heat the space to be conditioned, the fan assembly is operable to output conditioned air passed through the heat reject subsystem to the space to be conditioned, and the fan assembly is operable to output air passed through the heat accept subsystem away from the space to be conditioned.

In some embodiments, the micro-climate control system also includes a shroud placed around the heat reject subsystem and the heat accept subsystem which separates the conditioned and reject airflow from each other and directs each airflow. In some embodiments, the shroud directs the reject airflow upwards and directs the conditioned airflow downwards such that the system could be mounted horizontally such as in a ceiling. In some embodiments, there is unused space above the ceiling where the reject air can accumulate.

In some embodiments, the fan assembly includes a plurality of blades. In some embodiments, the fan assembly also includes a housing, wherein the heat pump is comprised in the housing.

In some embodiments, the fan assembly is an impeller-based fan assembly including a plurality of rotating discs that operate as impellers that draw air and then propel the air radially outward from the plurality of rotating discs. In some embodiments, outer edges of the plurality of rotating discs are structured to direct the air that is propelled radially outward from the plurality of rotating discs at a downward angle.

In some embodiments, the fan assembly is a centrifugal fan assembly including a plurality of vertical impellers, an air inlet, and an air outlet. The vertical impellers operable to rotate around the air inlet to draw the air into the air inlet and blow the air out of the air outlet.

In some embodiments, the thermoelectric heat pump includes a surround and spacer (SAS) structure comprising a wall defining a first open side and a second open side, an interconnect board enclosed within the SAS structure, the interconnect board comprising one or more openings from a first surface of the interconnect board to a second surface of the interconnect board, the one or more openings defining locations at which a plurality of thermoelectric modules are to be mounted on the interconnect board, and the plurality of thermoelectric modules mounted on the interconnect board at the locations defined by the one or more openings, each thermoelectric module of the plurality of thermoelectric modules having a first side and a second side. The thermoelectric heat pump also includes a hot-side heat spreader that is in thermal contact with the first side of each thermoelectric module of the plurality of thermoelectric modules and a cold-side heat spreader that is in thermal contact with the second side of each thermoelectric module of the plurality of thermoelectric modules. A periphery of the hot-side heat spreader mechanically contacts the wall of the SAS structure at the first open side, and a periphery of the cold-side heat spreader mechanically contacts the wall of the SAS structure at the second open side such that a compression force applied to the heat pump is absorbed by the SAS structure.

In some embodiments, the thermoelectric heat pump also includes an environmental seal located where the periphery of the hot-side heat spreader mechanically contacts the wall of the SAS structure and where the periphery of the cold-side heat spreader mechanically contacts the wall of the SAS structure.

In some embodiments, a thickness of the wall of the SAS structure is such that a thermal short between the hot-side heat spreader and the cold-side heat spreader is mitigated while providing sufficient strength to withstand at least a predefined amount of a compression force applied to the heat pump.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
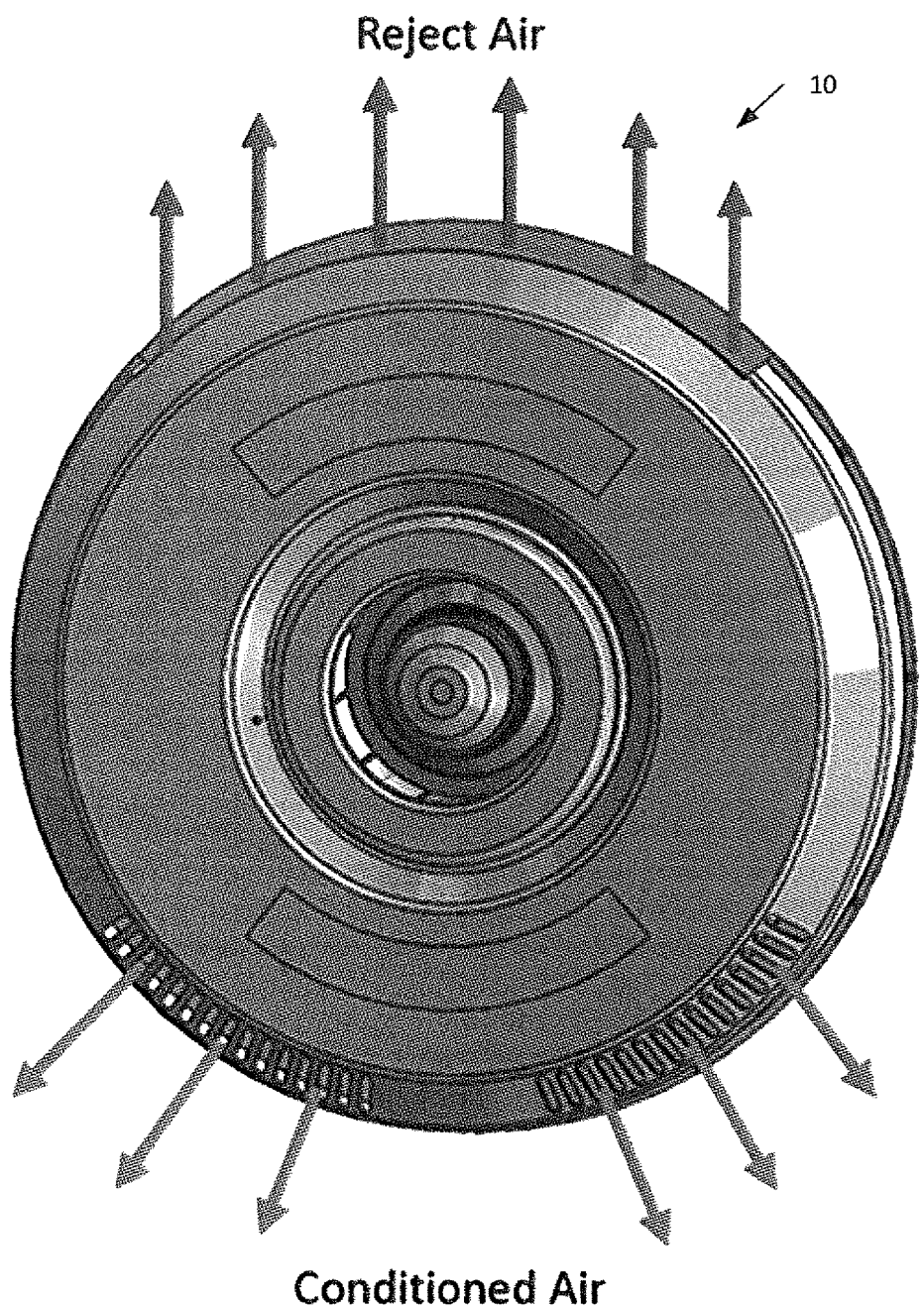
FIG. 1A illustrates the front of a micro-climate control system including a fan assembly and an active heat pumping system integrated with the fan assembly, according to some embodiments of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A cooled fan for micro-climate control is provided herein. In some embodiments, a micro-climate control system includes a fan assembly and a thermoelectric system integrated with the fan assembly. The thermoelectric system is operable to actively cool or heat air as the air passes through the fan assembly. The thermoelectric system includes a thermoelectric heat pump, a heat reject subsystem, and a heat accept subsystem. The fan assembly is operable to draw air from a space to be conditioned. The fan assembly is also operable to output conditioned air passed through one of the heat reject subsystem and the heat accept subsystem to the space to be conditioned and output air passed through the other one of the heat reject subsystem and the heat accept subsystem away from the space to be conditioned. In this way, conditioned air can be provided to a localized area with a system that maintains a small envelope. A micro-climate control system may provide localized comfort while allowing a larger climate control system to maintain a more efficient temperature set point. In this way, the overall energy consumption may be reduced while providing the same level of effective comfort.

In some embodiments, this system could be mounted vertically on a wall to provide local conditioned air. With changes to the shroud, the system could also be mounted horizontally in a ceiling. This setup would be especially useful when there is unused space above the ceiling where the reject air can accumulate. In these embodiments, the system could provide conditioned air to a room.

Figure 1B:
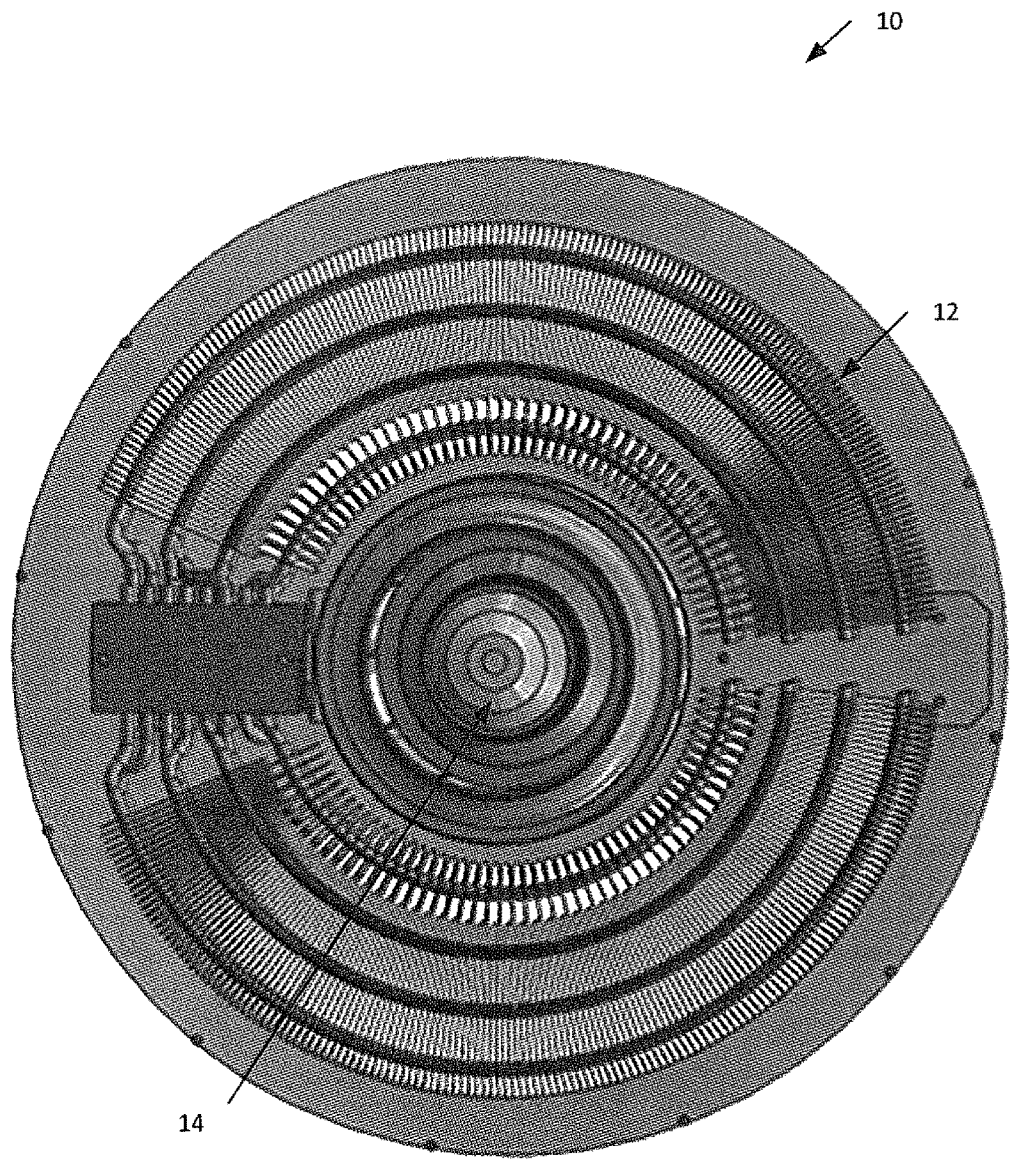
FIG. 1B illustrates the back of the micro-climate control system of FIG. 1A, according to some embodiments of the present disclosure.

FIGS. 1A and 1B illustrate one example of a fan assembly 10 including a thermoelectric system 12 and a fan assembly 14 according to some embodiments of the present disclosure. In this example, the thermoelectric system 12 is a thermoelectric cooling system. When rotating, the fan assembly 14 draws air into the fan assembly 10 through a central port and blows the air out of both a reject port and a conditioned air port, as illustrated. The air that flows through the central port and out of the reject port passes over a heat reject subsystem (see element 18 of FIG. 2). The air that flows through the central port and out of the reject port passes over a heat accept subsystem (see element 20 of FIG. 2) such that air that is blown out of the conditioned air port is cooled.

Figure 2:
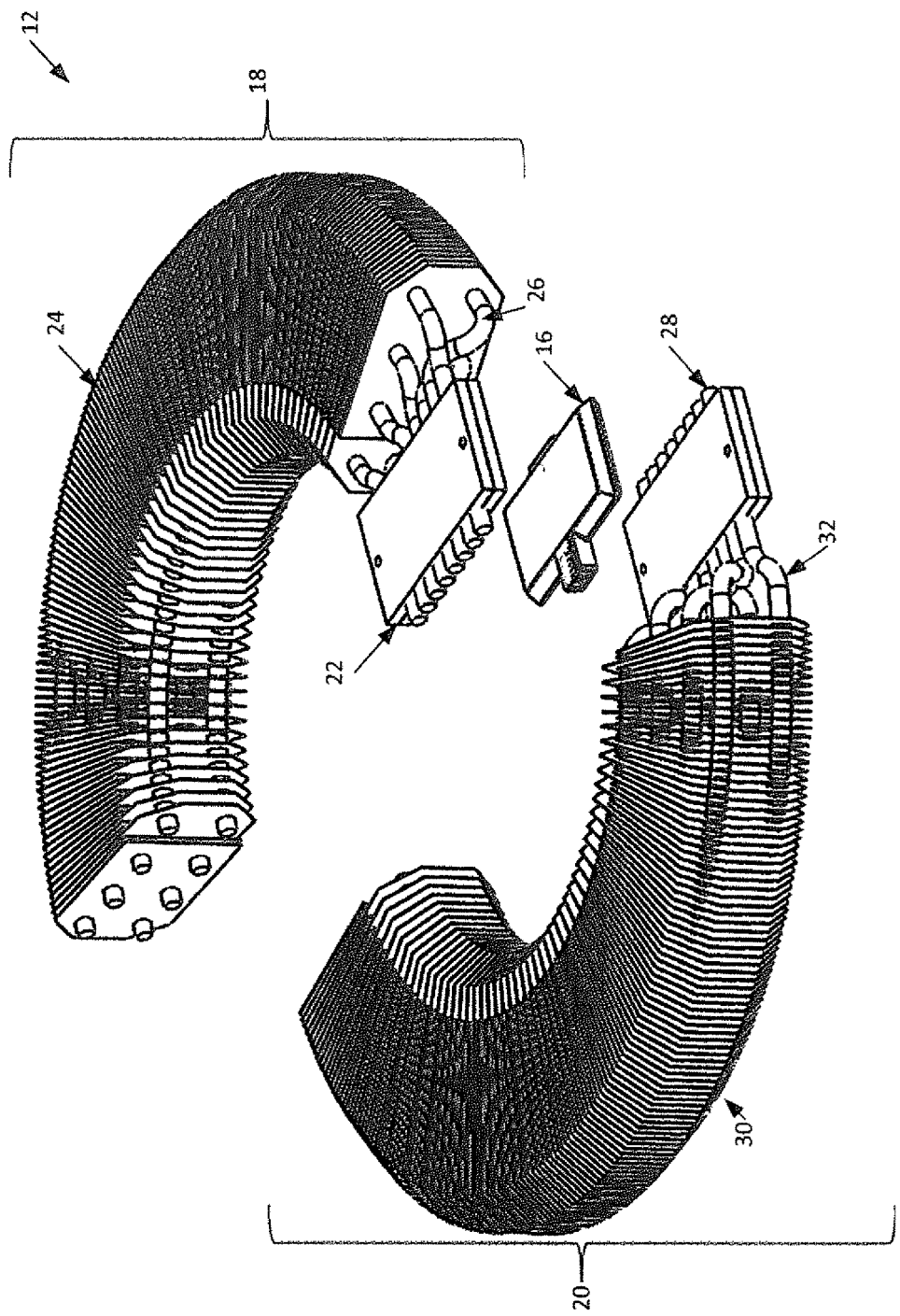
FIG. 2 illustrates a thermoelectric system of the micro-climate control system of FIGS. 1A and 1B, according to some embodiments of the present disclosure.

FIG. 2 illustrates the thermoelectric system 12 in more detail according to some embodiments of the present disclosure. As illustrated, the thermoelectric system 12 includes a thermoelectric heat pump 16, a heat reject subsystem 18, and a heat accept subsystem 20. The thermoelectric heat pump 16 generally includes one or more thermoelectric modules. One example of the thermoelectric heat pump 16 is described in U.S. Pat. No. 9,144,180 B2, entitled THERMOELECTRIC HEAT PUMP WITH A SURROUND AND SPACER (SAS) STRUCTURE, which issued Sep. 22, 2015 and is incorporated herein by reference in its entirety and is attached hereto as Appendix A. Note that the thermoelectric heat pump 12 of U.S. Pat. No. 9,144,180 B2 is only one example. Any thermoelectric heat pump may be used.

One example of such a heat pump includes a SAS structure. The SAS structure includes a wall defining a first open side and a second open side. The heat pump also includes an interconnect board enclosed within the SAS structure. The interconnect board includes openings from a first surface of the interconnect board to a second surface of the interconnect board where the openings define locations at which thermoelectric modules (TEMs) are to be mounted on the interconnect board. TEMs are mounted on the interconnect board at the locations defined by the openings. Each thermoelectric module has a first side and a second side. The heat pump additionally includes a hot-side heat spreader that is in thermal contact with the first side of each thermoelectric module and a cold-side heat spreader that is in thermal contact with the second side of each thermoelectric module. The periphery of the hot-side heat spreader mechanically contacts the wall of the SAS structure at the first open side, and the periphery of the cold-side heat spreader mechanically contacts the wall of the SAS structure at the second open side. A compression force applied to the heat pump is absorbed by the SAS structure and, as such, the TEMs are protected from the compression force.

A thermoelectric system is well suited for integration into a fan for micro-climate control. Some advantages include the small form factor and the ability to do both heating and cooling. In some embodiments, the micro-climate control system will have a separate heat exchanger for the hot and cold side of the thermoelectric system. Airflow for each heat exchanger will come from the space being conditioned. The output of the system will be conditioned air directed towards the space, and the reject air will be directed away from the space.

Returning to FIG. 2, the heat reject subsystem 18 includes, in this example, a heat exchanger 22 thermally coupled to a fin structure 24 via a plurality of thermosiphons 26. The thermosiphons 26 contain a coolant and provide two-phase heat exchange between a hot side of the thermoelectric heat pump 16 (via the heat exchanger 22) and the air being blown across the fin structure 24. In particular, the coolant is evaporated in the heat exchanger 22. The evaporated coolant flows through the thermosiphons 26 via buoyancy forces. The fin structure 24 provides heat exchange between evaporated coolant in the thermosiphons 26 and the air such that the coolant is condensed and the air is heated. The heated air is blown out of the reject port of the fan assembly 10 (see FIG. 1A), and the condensed coolant returns to the heat exchanger 22 via gravity forces that operate to cool a first side of the thermoelectric heat pump 16 and reject heat.

The heat accept subsystem 20 includes, in this example, a heat exchanger 28 thermally coupled to a fin structure 30 via a plurality of thermosiphons 32. The thermosiphons 32 contain a coolant and provide two-phase heat exchange between a cold side of the thermoelectric heat pump 16 (via the heat exchanger 28) and the air being blown across the fin structure 30. In particular, the coolant is condensed in the heat exchanger 28. The condensed coolant flows through the thermosiphons 32 via gravity forces. The fin structure 30 provides heat exchange between condensed coolant in the thermosiphons 32 and the air such that the coolant is evaporated and the air is cooled. The cooled air is blown out of the conditioned air port of the fan assembly 10 (see FIG. 1A), and the evaporated coolant returns to the heat exchanger 28 via buoyancy forces.

In some embodiments, the micro-climate control system includes a set of radial heat exchangers. A centrifugal fan at the center of the micro-climate control system will pull air into the heat exchangers. A shroud is placed around the heat exchangers which separates the conditioned and reject airflow from each other and directs each airflow.

Figure 3:
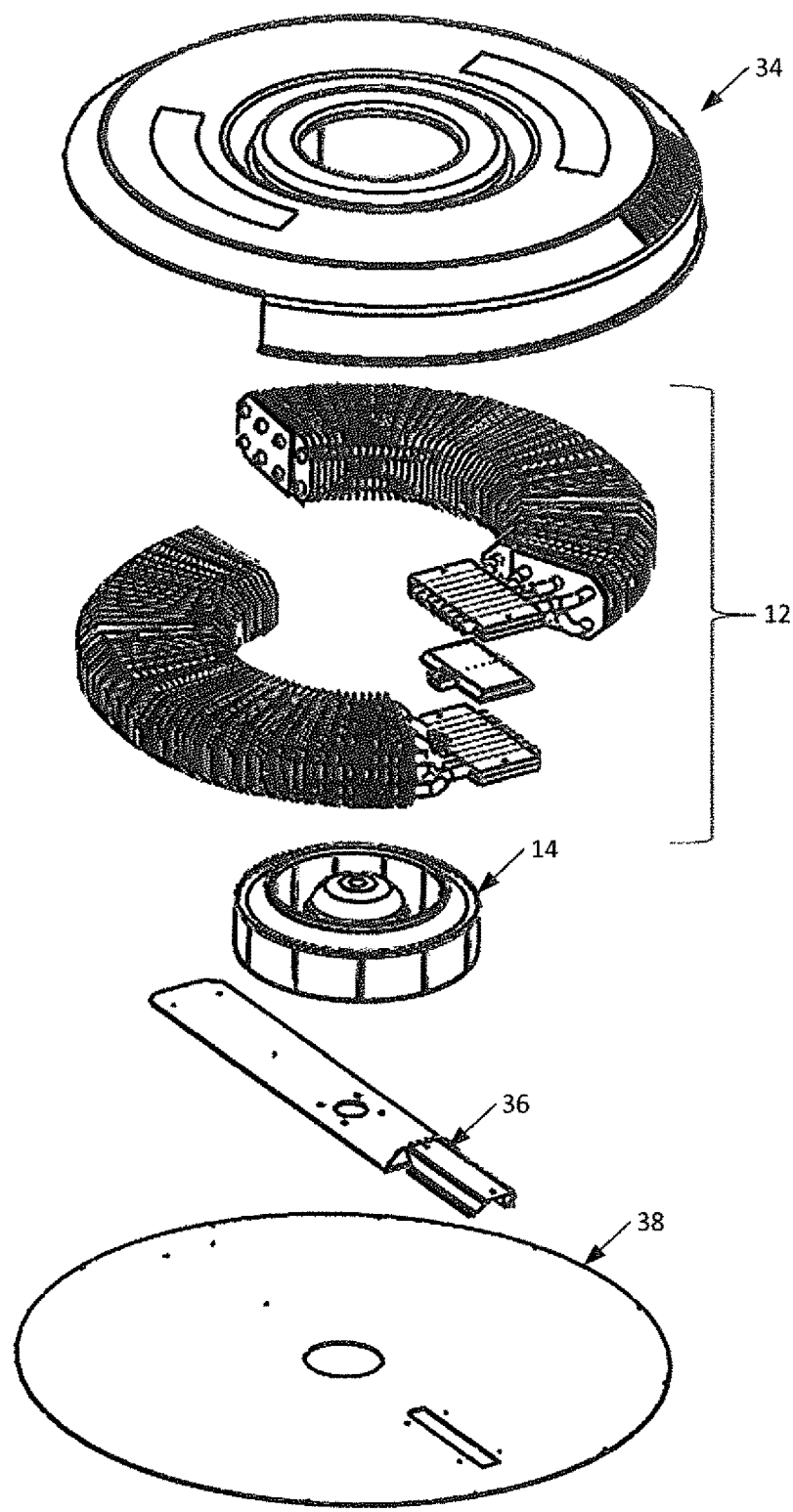
FIG. 3 illustrates an expanded view of the micro-climate control system of FIGS. 1A and 1B including the thermoelectric system of FIG. 2, according to some embodiments of the present disclosure.

FIG. 3 is an expanded view of the fan assembly 10 of FIGS. 1A and 1B including the thermoelectric system 12 of FIG. 2. As illustrated, the fan assembly 10, in this example, includes an upper housing portion 34, a bracket 36, and a lower housing portion 38 that form a housing of the fan assembly 10. The thermoelectric system 12 and the fan assembly 14 are secured within the housing. In some embodiments, the fan assembly 14 is an impeller-based fan assembly comprising multiple rotating discs that operate as horizontal impellers that draw air from the occupied space cooled or heated by the micro-climate control system into a central region of the rotating discs and then propels the air radially outward from the rotating discs. The active heat pumping system is operable to cool or heat the air as the air is drawn into the central region of the rotating discs. In some embodiments, outer edges of the rotating discs are structured to direct the air that is propelled radially outward from the rotating discs.

Those skilled in the art will recognize improvements and modifications to the preferred embodiments of the present disclosure. All such improvements and modifications are considered within the scope of the concepts disclosed herein and the claims that follow.

What is claimed is:

1. A micro-climate control system, comprising:
   a fan assembly; and
   a thermoelectric system integrated with the fan assembly and being operable to actively cool or heat air as the air passes through the fan assembly, the thermoelectric system comprising:
      a thermoelectric heat pump;
      a heat reject subsystem comprising a first radial heat exchanger; and
      a heat accept subsystem comprising a second radial heat exchanger;
   wherein the fan assembly is operable to:
      draw air from a space to be conditioned;
      output conditioned air passed through one of the heat reject subsystem and the heat accept subsystem to the space to be conditioned; and
      output air passed through the other one of the heat reject subsystem and the heat accept subsystem away from the space to be conditioned.

2. The micro-climate control system of claim 1 wherein:
the thermoelectric system is operable to cool the space to be conditioned;
the fan assembly is operable to output the conditioned air passed through the heat accept subsystem to the space to be conditioned; and
the fan assembly is operable to output the air passed through the heat reject subsystem away from the space to be conditioned.

3. The micro-climate control system of claim 1 wherein:
the thermoelectric system is operable to heat the space to be conditioned;
the fan assembly is operable to output the conditioned air passed through the heat reject subsystem to the space to be conditioned; and
the fan assembly is operable to output the air passed through the heat accept subsystem away from the space to be conditioned.

4. The micro-climate control system of claim 1 further comprising a shroud placed around the heat reject subsystem and the heat accept subsystem which separates the conditioned and reject airflow from each other and directs each airflow.

5. The micro-climate control system of claim 4 wherein the shroud directs the reject airflow upwards and directs the conditioned airflow downwards such that the system could be mounted horizontally such as in a ceiling.

6. The micro-climate control system of claim 5 wherein there is unused space above the ceiling where the reject air can accumulate.

7. The micro-climate control system of claim 1 wherein the fan assembly comprises a plurality of blades.

8. The micro-climate control system of claim 7 wherein the fan assembly further comprises a housing, wherein the heat pump is comprised in the housing.

9. The micro-climate control system of claim 1 wherein:
the fan assembly is an impeller-based fan assembly comprising a plurality of rotating discs that operate as impellers that draw air and then propel the air radially outward from the plurality of rotating discs.

10. The micro-climate control system of claim 9 wherein outer edges of the plurality of rotating discs are structured to direct the air that is propelled radially outward from the plurality of rotating discs at a downward angle.

11. The micro-climate control system of claim 1 wherein:
the fan assembly is a centrifugal fan assembly comprising a plurality of vertical impellers, an air inlet, and an air outlet, the plurality of vertical impellers operable to rotate around the air inlet to draw the air into the air inlet and blow the air out of the air outlet.

12. The micro-climate control system of claim 1 wherein the thermoelectric heat pump comprises:
a surround and spacer (SAS) structure comprising a wall defining a first open side and a second open side;
an interconnect board enclosed within the SAS structure, the interconnect board comprising one or more openings from a first surface of the interconnect board to a second surface of the interconnect board, the one or more openings defining locations at which a plurality of thermoelectric modules are to be mounted on the interconnect board;
the plurality of thermoelectric modules mounted on the interconnect board at the locations defined by the one or more openings, each thermoelectric module of the plurality of thermoelectric modules having a first side and a second side;
a hot-side heat spreader that is in thermal contact with the first side of each thermoelectric module of the plurality of thermoelectric modules; and
a cold-side heat spreader that is in thermal contact with the second side of each thermoelectric module of the plurality of thermoelectric modules;
wherein a periphery of the hot-side heat spreader mechanically contacts the wall of the SAS structure at the first open side, and a periphery of the cold-side heat spreader mechanically contacts the wall of the SAS structure at the second open side such that a compression force applied to the heat pump is absorbed by the SAS structure.

13. The micro-climate control system of claim 12 wherein the thermoelectric heat pump further comprises an environmental seal located where the periphery of the hot-side heat spreader mechanically contacts the wall of the SAS structure and where the periphery of the cold-side heat spreader mechanically contacts the wall of the SAS structure.

14. The micro-climate control system of claim 12 wherein a thickness of the wall of the SAS structure is such that a thermal short between the hot-side heat spreader and the cold-side heat spreader is mitigated while providing sufficient strength to withstand at least a predefined amount of a compression force applied to the heat pump.

15. A micro-climate control system, comprising:
a fan assembly;
a thermoelectric system integrated with the fan assembly and being operable to actively cool or heat air as the air passes through the fan assembly, the thermoelectric system comprising:
a thermoelectric heat pump;
a heat reject subsystem; and
a heat accept subsystem;
wherein the fan assembly is operable to:
draw air from a space to be conditioned;
output conditioned air passed through one of the heat reject subsystem and the heat accept subsystem to the space to be conditioned; and
output air passed through the other one of the heat reject subsystem and the heat accept subsystem away from the space to be conditioned; and
a shroud placed around the heat reject subsystem and the heat accept subsystem which separates the conditioned and reject airflow from each other and directs each airflow.

16. A micro-climate control system, comprising:
a fan assembly; and
a thermoelectric system integrated with the fan assembly and being operable to actively cool or heat air as the air passes through the fan assembly, the thermoelectric system comprising:
a thermoelectric heat pump;
a heat reject subsystem; and
a heat accept subsystem;
wherein the fan assembly is operable to:
draw air from a space to be conditioned;
output conditioned air passed through one of the heat reject subsystem and the heat accept subsystem to the space to be conditioned; and
output air passed through the other one of the heat reject subsystem and the heat accept subsystem away from the space to be conditioned; and
wherein the thermoelectric heat pump comprises:
a surround and spacer (SAS) structure comprising a wall defining a first open side and a second open side;

an interconnect board enclosed within the SAS structure, the interconnect board comprising one or more openings from a first surface of the interconnect board to a second surface of the interconnect board, the one or more openings defining locations at which a plurality of thermoelectric modules are to be mounted on the interconnect board;

the plurality of thermoelectric modules mounted on the interconnect board at the locations defined by the one or more openings, each thermoelectric module of the plurality of thermoelectric modules having a first side and a second side;

a hot-side heat spreader that is in thermal contact with the first side of each thermoelectric module of the plurality of thermoelectric modules; and a cold-side heat spreader that is in thermal contact with the second side of each thermoelectric module of the plurality of thermoelectric modules;

wherein a periphery of the hot-side heat spreader mechanically contacts the wall of the SAS structure at the first open side, and a periphery of the cold-side heat spreader mechanically contacts the wall of the SAS structure at the second open side such that a compression force applied to the heat pump is absorbed by the SAS structure.

* * * * *